Figure 1:
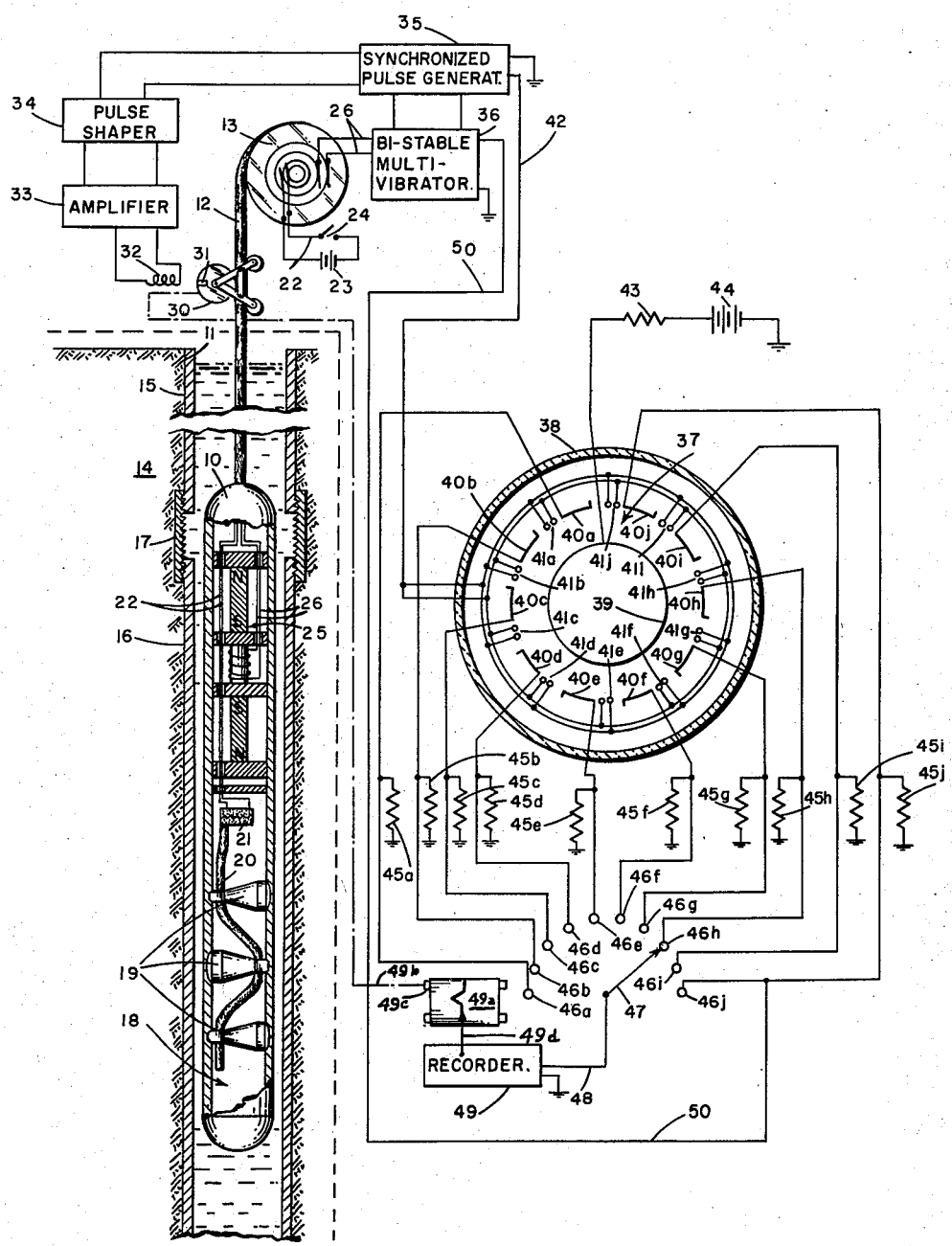

July 15, 1958     D. R. TANGUY     2,842,852
MEMORIZING SYSTEM
Filed March 16, 1955     2 Sheets-Sheet 2

INVENTOR.
DENIS R. TANGUY.
BY Robert Hockfield
HIS ATTORNEY.

United States Patent Office 2,842,852
Patented July 15, 1958

2,842,852
MEMORIZING SYSTEM

Denis R. Tanguy, Houston, Tex., assignor, by mesne assignments, to Schlumberger Well Surveying Corporation, Houston, Tex., a corporation of Texas Application March 16, 1955, Serial No. 494,797

8 Claims. (Cl. 33—125)

This invention relates to memorizing systems and, more particularly, pertains to a memorizing system for utilizing a pulse produced by an instrument representing the occurrence of a given event as the instrument traverses a bore hole drilled into the earth.

In certain operations in which an instrument is lowered into a bore hole, it is often desirable to refer the occurrence of an event at some depth in the bore hole to a different depth. For example, a casing perforator may be lowered on a cable whose length may be measured as an indication of the depth of the perforator and the bore hole instrument may be further provided with a casing collar locator for determining the joints between adjacent sections of the casing as an aid to accurate depth determinations. However, in practice, the casing collar locator is physically spaced from the perforator portion of the bore hole apparatus and thus the casing collar indications are not accurately representative of the passing of the perforator portion relative to a casing joint.

To overcome this difficulty, various memory devices have been proposed. For example, in one case a magnetic tape is driven in synchronism with movement of the bore hole instrument and recordings of the events to be memorized are made on the tape. At a distance along the tap corresponding to the desired depth shift, there is disposed a pick up head for deriving a signal having the desired depth correlation. Obviously, such mechanical memory devices are often complex in their construction and sometimes unreliable in operation.

Therefore, it is an object of the present invention to provide a new and improved memorizing system for utilizing pulses produced by an instrument adapted to traverse a bore hole which is simple to construct and reliable in operation.

Another object of the present invention is to provide a new and improved memorizing system featuring a minimum of moving parts.

A memorizing system embodying the present invention may utilize a pulse produced by an instrument representing the occurrence of a given event as the instrument traverses a bore hole drilled into the earth. The system comprises a discharge device including a plurality of discharge paths and discharge transfer means for sequentially establishing discharges in the discharge paths. The system further comprises means responsive to a pulse from an instrument in a bore hole representing the occurrence of a given event for supplying a series of pulses to the discharge transfer means; each of the pulses in the series of pulses represents a unit change in displacement of the instrument along the bore hole. Means are provided for deriving an indication in response to a discharge in a selected one of the discharge paths.

Figure 2:
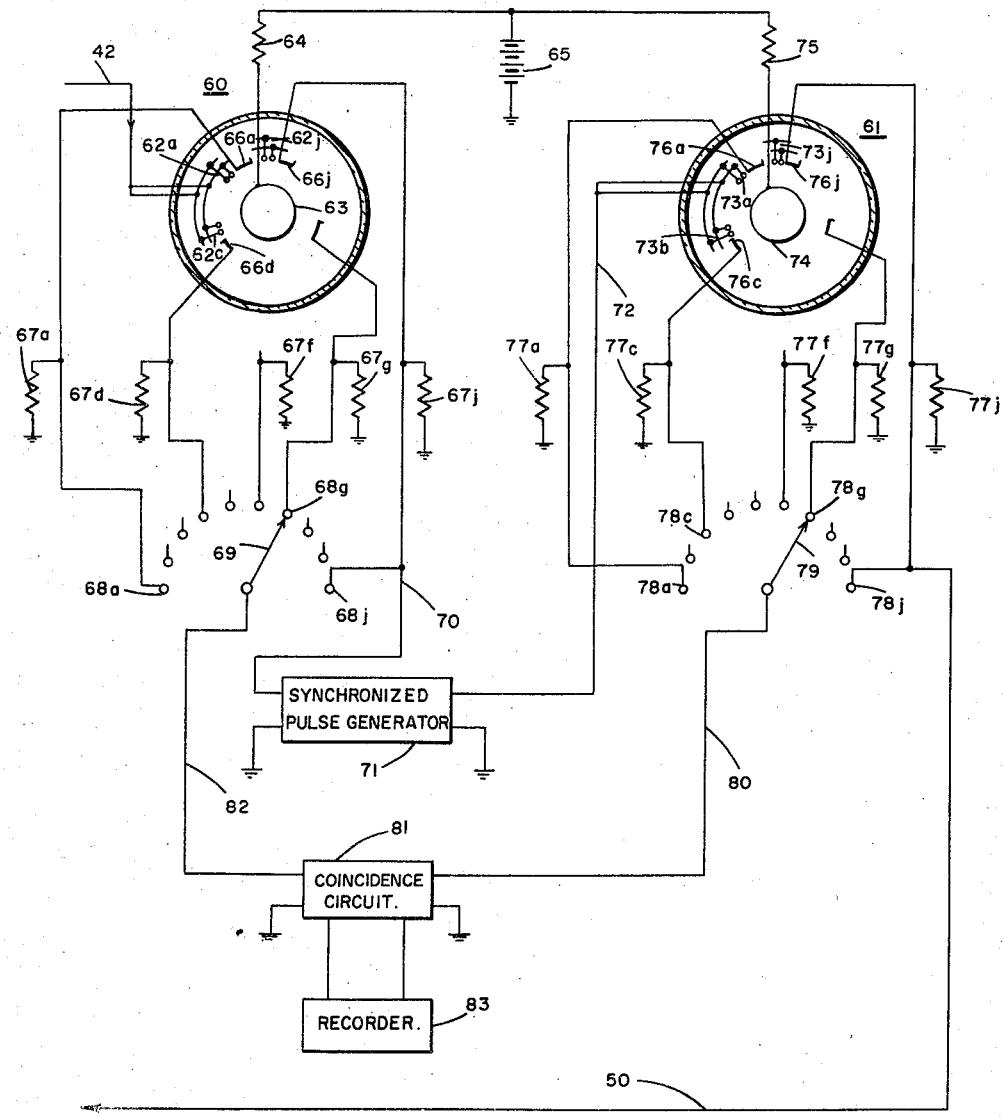

The novel features of the present invention are set forth with particularity in the appended claims. The present invention, both as to its organization and manner of operation, together with further objects and advantages thereof, may best be understood by reference to the following description taken in connection with the accompanying drawings in which:

Fig. 1 is a schematic diagram, partly in block form, of a memorizing system embodying the present invention shown in operative relation with a gun perforator and casing collar locator unit disposed in a bore hole; and Fig. 2 represents a modification which may be connected to a portion of the apparatus represented in Fig. 1.

In Fig. 1 of the drawings there is shown a fluid-tight housing 10 supported in a bore hole 11 by an armored cable 12 which together with a winch 13 may be employed for lowering and raising housing 10 in the bore hole. Bore hole 11 traverses a plurality of earth formations 14 and may be provided with a casing including a string of sections, such as sections 15 and 16 joined together by threaded couplings 17.

Housing 10 includes a lower, casing perforator section 18 which may include any conventional type of perforating units, such as shaped charges 19, as illustrated. The charges 19 may be fired by means of a primacord 20, in turn, fired by a blasting cap 21 to which leads 22 are connected. The leads 22 extend through housing 10 and cable 12, and a circuit to a battery 23 at the surface of the earth may be selectively completed by means of an operating switch 24.

The length of cable 12 may be measured in the usual manner such as by coupling a measuring wheel (not shown) to the cable in order to position housing 10 at a selected depth in bore hole 11. Additional accuracy in positioning housing 10 is often desirable so that perforator units 19 may be fired when housing section 18 is precisely located at the desired depth. To this end, there is also provided a casing collar locator unit 25 at the upper end of housing 10. Any well-known construction may be employed; for example, the casing collar locator may be of the type disclosed in Patent 2,558,427, as shown. A magnetic circuit is provided in the casing collar locator 25 so that when it passes opposite one of the casing joints, such as the one designated 17, a pulse appears at a pair of leads 26 which extend through cable 12 to the surface of the earth. Accordingly, a record of the number of joints which are passed by the casing collar locator 25 may be obtained as a function of depth in a known manner.

As evident in Fig. 1, casing collar locator 25 is physically spaced from perforator unit 18 relative to the axis of the bore hole and thus the indications of the casing joints are not precisely representative of the position of the perforator 18. To accommodate this depth discrepancy, there is provided a memorizing system embodying the present invention.

Frictionally coupled to cable 12 in a measuring wheel 30 having a small permanent magnet 31 attached near its periphery. Rotation of the measuring wheel 30 is representative of movement of the cable 12, and thus of the housing 10, and each time wheel 30 carries magnet 31 into the vicinity of a coil 32 a pulse is produced. Thus, a series of pulses is derived in which each pulse represents a unit change in displacement of housing 10 along bore hole 11.

Coil 32 is coupled to an amplifier 33, in turn, coupled to a pulse shaper 34 which provides pulses of uniform height and width in response to the applied pulses. The pulse shaper is coupled to a synchronized pulse generator 35, which is under the control of a bistable multivibrator 36; i. e. multivibrator 36 determines whether generator 35 operates or whether it is disabled. Leads 26 from casing collar locator 25 are connected to one input circuit of the bistable multivibrator 36.

There is also provided a gaseous discharge device of the polycathode glow type commonly referred to as a "Dekatron." Glow tube 37 may be similar to the devices described in the publication Electronic Engineering in an article in the May 1950 issue by R. C. Bacon and J. R. Pollard entitled "The Dekatron," and in an article by J. R. Acton entitled "The single pulse Dekatron" in the issue for February 1952.

Discharge device 37 is enclosed by an envelope 38 and includes a central cylindrical anode 39 surrounded by cathodes 40a, 40b . . . 40i and 40j. Of course, while ten discharge paths are thus provided, obviously any desired number of paths may be employed. Device 37 further includes a plurality of discharge transfer electrodes 41a, 41b . . . 41i and 41j. The discharge transfer electrodes are connected together, and by means of a lead 42, are connected to the output circuit of synchronized pulse generator 35. Anode 39 is connected through an anode resistor 43 to the positive terminal of a source of B-supply potential 44 having its negative terminal grounded.

Each of the cathodes 40a—40j is connected to ground through an individual one of resistors 45a—45j and to an individual one of fixed contacts 46a—46j of a selector switch which includes a movable wiper arm 47. Arm 47 is connected by a lead 48 to a recorder 49 in which the recording medium 49a is displaced in proportion to movement of housing 10 through bore hole 11. Such movement may be conveniently obtained by means of a mechanical connection, illustrated schematically by a broken line 49b, between wheel 30 and a take-up spool 49c for recording medium 49a. Recorder 49 includes a conventional marking device 49d for producing indications on medium 49a in response to applied signals.

If the discharge path between cathode 40a and anode 39 is considered as an initial discharge path, the path between cathode 40j and anode 39 may be defined as a final one and a lead 50 from cathode 40j extends to the remaining input circuit of bistable multivibrator 36. Appropriate ground connections, of course, are provided to complete the various coupling circuits wherever necessary.

To condition the memorizing system embodying the invention for operation, movable arm 47 is positioned in engagement with one of the contacts 46a—46j providing a desired depth shift which may be more evident from the discussion to follow. It is assumed that while housing 10 traverses a portion of the bore hole including casing sections between the casing joints, bistable multivibrator 36 is in one of its two operative conditions wherein synchronized pulse generator 35 is disabled. It is further assumed that a glow discharge is present in the final path, i. e., between anode 39 and cathode 40j.

As casing collar locator 25 passes one of the casing joints, such as the one designated 17 in Fig. 1, a pulse appears at leads 26 and is supplied to the bistable multivibrator 36 which is transferred to its other condition of operation, thereby operatively conditioning synchronized pulse generator 35. With each rotation of measuring wheel 30, magnet 31 produces a pulse which appears at the output leads of coil 32 and these pulses, after amplification in stage 33 and shaping in stage 34, are applied to pulse generator 35 which produces corresponding pulses that are supplied to the glow transfer electrodes 41a—41j.

Since pulse generator 35 is operatively conditioned in response to the occurrence of the given event, namely the passing of a casing joint by the casing collar locator, the system includes means responsive to such a pulse for supplying pulses in a series, representing the pulses generated by measuring wheel 30, to the discharge transfer electrodes 41a—41j. Accordingly, the first in this series of pulses transfers the discharge to the initial discharge path between anode 39 and cathode 40a and each successive pulse causes the charge to be transferred to successive ones of the discharge paths as is well known in the operation of a Dekatron.

Since selector arm 47 is illustratively shown in engagement with the contact 46h, when the discharge reaches the path between anode 39 and cathode 40h, the initiation of a glow discharge produces a current pulse in cathode resistor 45h. The resulting voltage pulse is supplied over lead 48 to recorder 49. It is therefore evident that an output signal is developed which corresponds to the initial event delayed by seven times the interval between timing pulses for the exemplary case.

As the pulses in the series from generator 35 continue to step the discharge from path to path in device 37, the final discharge path between anode 39 and cathode 40j is eventually ionized. The resulting pulse produced at resistor 45j is supplied over lead 50 to the second input circuit of bistable multivibrator 36 which is thus transferred to its other operative condition thereby disabling pulse generator 35.

The system remains in the last-defined condition with a discharge in the final path between anode 39 and cathode 40j, and with bistable multivibrator 36 in its condition of operation which disables pulse generator 35. However, when locator 25 passes the next casing joint (not shown) a pulse is supplied over leads 26 to the bistable multivibrator 36 and a cycle of operation is initiated and carried out in the manner just described.

It is evident that by suitably positioning arm 46 in engagement with a selected one of the contacts 46a—46j, any of ten different delays may be established. Accordingly, a particular delay may be selected which compensates for the longitudinal distance between perforator 18 and casing collar locator 25 of housing 10. In this way, accurate indications of the position of the perforator unit relative to the casing joints may be obtained on the record derived by recorder 49.

Of course, if a discharge device including a greater number of discharge paths is employed, the amount of delay which might be achieved is proportionately increased. In addition, synchronized pulse generator 35 may be of the type producing a pulse in response to a selected number of input pulses, namely it may be a frequency divider. In this way, the distance between successive steps may be increased.

From the foregoing discussion, it is evident that a memorizing system embodying the present invention is relatively simple and thus inexpensive to construct. In addition, it is efficient and reliable in operation and no mechanical or moving parts, other than measuring wheel 30, are required.

In the modified arrangement of Fig. 2, two glow type discharge devices 60 and 61 are employed. Each of these may be of the type illustrated in Fig. 1, although for the sake of simplicity in representation only a portion of each of these devices has been shown.

Lead 42 which extends from synchronized pulse generator 35 is connected to the glow transfer electrodes 62a—62j of device 60 whose anode 63 is connected via an anode resistor 64 to a source of supply potential 65. Cathodes 66a—66j are provided with individual cathode resistors 67a—67j and are connected to respective ones of fixed contacts 68a—68j of a selector switch provided with a movable contact 69.

A lead 70 extends from cathode 66j to the input circuit of a synchronized pulse generator 71 whose output circuit is connected by a lead 72 to discharge transfer electrodes 73a—73j of discharge device 61. Anode 74 is connected by an anode resistor 75 to source 65 and cathodes 76a—76j are grounded by individual cathode resistors 77a—77j. In addition, the cathodes are connected to individual ones of fixed contacts 78a—78j of a selector switch. The final cathode 76j is also connected by lead 50 to an input circuit of bistable multivibrator 36 (Fig. 1).

The selector switch includes a movable contact 79 connected by a lead 80 to one input circuit of a coincidence circuit 81 of conventional construction, and the remaining input circuit of the coincidence circuit is connected by a lead 82 to movable arm 69. The output circuit of the coincidence stage 81 is connected to a recorder 83 in which the recording medium is displaced in proportion to movement of housing 10 through bore hole 11.

In operation polycathode glow discharge device 60 operates in the same manner as does discharge device 37 in the arrangement of Fig. 1. However, the output pulse at its last or final cathode 66j operates and synchronizes pulse generator 71 which, in turn, supplies corresponding pulses to the discharge transfer electrodes 73a—73j of discharge device 61. Thus, each time a glow discharge occurs between anode 63 and cathode 66j of discharge device 60, the discharge is transferred from one discharge path to another in discharge device 61.

Switch arms 69 and 79 are positioned in engagement with selected ones of contacts 68a—68j and 78a—78j, respectively, so that at some point in the operation of glow discharge devices 60 and 61 coincident pulses are supplied over leads 80 and 82 to coincidence circuit 81. When this occurs, a pulse is supplied to recorder 83.

It is obvious that by the use of two polycathode glow discharge devices in cascade, the memorizing capacity of the system is increased by a factor of ten as compared with the arrangement of Fig. 1.

Alternatively, if the pulses generated as measuring wheel 30 carries magnet 31 past coil 32 are spaced at closer intervals, the accuracy of the memorizing system may be increased.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A system for deriving an output signal delayed from a pulse representing the occurrence of a given event as an instrument supported by a cable is passed through a bore hole drilled into the earth comprising: a discharge device including a plurality of discharge paths and discharge transfer means for sequentially establishing discharges in said discharge paths; means responsive to movement of the cable and to a pulse representing the occurrence of the given event for supplying a series of pulses to said discharge transfer means, each of the pulses in said series of pulses representing a unit change in displacement of the instrument along the bore hole; and utilization means responsive to a discharge in a selected one of said discharge paths.

2. A memorizing system for utilizing a pulse produced by an instrument representing the occurrence of a given event as the instrument is passed by means of a supporting cable through a bore hole drilled into the earth comprising: a gaseous discharge device including a plurality of discharge paths and discharge transfer means for sequentially establishing discharges in said discharge paths; means responsive to movement of the cable and to a pulse from the instrument in a bore hole representing the occurrence of a given event for supplying a series of pulses to said discharge transfer means, each of the pulses in said series of pulses representing a unit change in displacement of the instrument along the bore hole; and indicator means responsive to a discharge in a selected one of said discharge paths.

3. A memorizing system for utilizing a pulse produced by an instrument representing the occurrence of a given event as the instrument is passed by means of a supporting cable through a bore hole drilled into the earth comprising: a gaseous discharge device including a plurality of discharge paths and discharge transfer means for sequentially establishing discharges in said discharge paths; means responsive to movement of the cable and to a pulse from the instrument in a bore hole representing the occurrence of a given event for supplying a series of pulses to said discharge transfer means, each of the pulses in said series of pulses representing a unit change in displacement of the instrument along the bore hole; a selector switch for selectively completing an electrical circuit to one of said discharge paths; and indicator means electrically coupled to said selector switch.

4. A memorizing system for utilizing a pluse produced by an instrument representing the occurrence of a given event as the instrument is passed by means of a supporting cable through a bore hole drilled into the earth comprising: a gaseous discharge device including a plurality of discharge paths and discharge transfer means for sequentially establishing discharges in said discharge paths; means responsive to movement of the cable and to a pulse from the instrument in a bore hole representing the occurrence of a given event for supplying a series of pulses to said discharge transfer means, each of the pulses in said series of pulses representing a unit change in displacement of the instrument along the bore hole; and indicator means having a recording medium displaced in proportion to movement of the instrument in the bore hole and a marking device responsive to a discharge in a selected one of said discharge paths for producing a visual indication at a position on said recording medium displaced along said medium relative to a reference point by an amount proportional to a desired depth shift along the bore hole.

5. A memorizing system for utilizing a pulse produced by an instrument representing the occurrence of a given event as the instrument is passed by means of a supporting cable through a bore hole drilled into the earth comprising: a gaseous discharge device including a plurality of discharge paths and discharge transfer means for sequentially establishing discharges in said discharge paths; a normally inoperative pulse generator adapted to be operatively conditioned in response to a control potential to produce pulses in synchronism with applied pulses; means coupled to said pulse generator and responsive to movement of the cable for deriving a series of pulses, each of the pulses in said series of pulses representing a unit change in displacement of the instrument along the bore hole; means responsive to a pulse from the instrument in a bore hole representing the occurrence of a given event for deriving a control potential for operatively conditioning said pulse generaor; means for coupling said pulse generator to said discharge transfer means of said discharge device; and indicator means responsive to a discharge in a selected one of said discharge paths.

6. A memorizing system for utilizing a pulse produced by an instrument representing the occurrence of a given event as the instrument is passed by means of a supporting cable through a bore hole drilled into the earth comprising: a gaseous discharge device including a plurality of discharge paths and discharge transfer means for sequentially establishing discharges in said discharge paths between initial and final discharge paths; means responsive to movement of the cable for producing a series of pulses, each of the pulses in said series of pulses representing a unit change in displacement of the instrument along a bore hole; a pulse generator coupled to said means for producing a series of pulses for applying pulses to said discharge transfer means of said discharge device and having an operative condition for deriving one pulse in response to the application of a selected number of pulses and having an inoperative condition; a bistable multivibrator coupled to said pulse generator and having a first operative condition establishing said operative condition in said pulse generator and having a second operative condition for establishing said inoperative condition; means responsive to a pulse from the instrument in a bore hole representing the occurrence of a given event for establishing said first operative condition in said bistable multivibrator thereby to effect a discharge in said initial discharge path and in discharge paths successive thereto in response to pulses from said pulse generator; indicator means responsive to a discharge in a selected one of said discharge paths; and means responsive to a discharge in said final discharge path for establishing said second operative condition in said bistable multivibrator.

7. A memorizing system for utilizing a pulse produced by an instrument representing the occurrence of a given event as the instrument is passed by means of a supporting cable through a bore hole drilled into the earth comprising: first and second gaseous discharge devices individually including a plurality of discharge paths and discharge transfer means for sequentially establishing discharges in said discharge paths; means responsive to movement of the cable and to a pulse from the instrument in a bore hole representing the occurrence of a given event for supplying a series of pulses to said discharge transfer means of said first discharge device, each of the pulses in said series of pulses representing a unit change in displacement of the instrument along the bore hole; means responsive to the occurrence of a given number of successive discharges in said first discharge device for applying each of a sequence of pulses to said discharge transfer means of said second discharge device; and indicator means responsive to substantially coincident discharges in selected discharge paths of said first and said second discharge devices.

8. A memorizing system for utilizing a pulse produced by an instrument representing the occurrence of a given event as the instrument is passed by means of a supporting cable through a bore hole drilled into the earth comprising: first and second gaseous discharge devices including a plurality of discharge paths and discharge transfer means for sequentially establishing discharges in said discharge paths; means responsive to movement of the cable and to a pulse from the instrument in a bore hole representing the occurrence of a given event for supplying a series of pulses to said discharge transfer means of said first discharge device, each of the pulses in said series of pulses representing a unit change in displacement of the instrument along the bore hole; means responsive to the occurrence of a given number of successive discharges in said first discharge device for applying a pulse to said discharge transfer means of said second discharge device; a coincidence device having an output circuit for deriving an output signal in response to the simultaneous occurrence of input pulses; having a first input circuit adapted to be selectively coupled to one of said discharge paths of said first discharge device and having a second input circuit adapted to be selectively coupled to one of said discharge paths of said second discharge device; and indicator means coupled to said output circuit of said coincidence device.

References Cited in the file of this patent

UNITED STATES PATENTS

| 2,696,572 | Schmid | Dec. 7, 1954 |
| 2,701,334 | Alder | Feb. 1, 1955 |
| 2,713,147 | Stripling | July 12, 1955 |

FOREIGN PATENTS

| 654,313 | Great Britain | June 13, 1951 |
| 707,458 | Great Britain | Apr. 21, 1954 |

OTHER REFERENCES

Articles entitled, "An Industrial Batching Counter," by R. W. Brierly, and "A Cold Cathode Batching Counter," by P. E. Tooke, on pages 157 to 162 of "Electronic Engineering," vol. 26, No. 314, April 1954.